(12) United States Patent
Honeck

(10) Patent No.: US 10,209,119 B2
(45) Date of Patent: *Feb. 19, 2019

(54) SYSTEM FOR SENSING FLOWABLE SUBSTRATE LEVELS IN A STORAGE UNIT

(71) Applicant: Extron Company, Minneapolis, MN (US)

(72) Inventor: Randall G. Honeck, Maple Grove, MN (US)

(73) Assignee: Extron Company, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,706

(22) Filed: Sep. 1, 2017

(65) Prior Publication Data
US 2018/0017426 A1 Jan. 18, 2018

Related U.S. Application Data

(63) Continuation of application No. 14/813,935, filed on Jul. 30, 2015, now Pat. No. 9,752,918.

(60) Provisional application No. 62/033,040, filed on Aug. 4, 2014.

(51) Int. Cl.
| | | |
|---|---|---|
| *G01R 27/04* | (2006.01) | |
| *G01F 23/284* | (2006.01) | |
| *G01F 23/28* | (2006.01) | |
| *B65B 1/48* | (2006.01) | |

(52) U.S. Cl.
CPC ............ *G01F 23/284* (2013.01); *G01F 23/28* (2013.01); *B65B 1/48* (2013.01)

(58) Field of Classification Search
CPC .......... B65B 1/48; G01D 7/00; G01D 3/0365; G01F 23/0069; G01F 23/284; G01F 23/296; G01F 23/261; G01F 23/28; B65D 90/48; B65G 41/002; B65G 65/466; G01R 27/2605; G06M 11/00
See application file for complete search history.

(56) References Cited

U.S. PATENT DOCUMENTS

| | | | |
|---|---|---|---|
| 3,807,231 A | 4/1974 | Spaw | |
| 3,876,121 A | 4/1975 | Preikschat | |
| 4,170,311 A | 10/1979 | Spaw | |
| 4,293,854 A | 10/1981 | Gookins | |
| 4,583,300 A * | 4/1986 | Mast | A23B 9/08 34/557 |
| 4,916,830 A * | 4/1990 | Braun | F26B 25/002 34/550 |
| 9,752,918 B2 * | 9/2017 | Honeck | G01F 23/28 |
| 2004/0027137 A1 * | 2/2004 | Sherrard | G01F 23/268 324/644 |

(Continued)

OTHER PUBLICATIONS

Office Action dated Jun. 15, 2018 in U.S. Appl. No. 15/229,797, 12 pages.

*Primary Examiner* — Vinh Nguyen
(74) *Attorney, Agent, or Firm* — Merchant & Gould P.C.

(57) ABSTRACT

A system for estimating a flowable substrate level in a storage unit is disclosed. In one embodiment, the system includes a transmitter and a conductor that extend downwardly into a grain storage bin, which cycles through a range of frequencies in order to determine the resonant frequency of the conductor which changes depending on the amount of grain in the bin.

14 Claims, 6 Drawing Sheets

(56) References Cited

U.S. PATENT DOCUMENTS

| | | | |
|---|---|---|---|
| 2009/0207032 A1* | 8/2009 | Gunthorpe | G01F 23/261 340/617 |
| 2012/0137767 A1 | 6/2012 | Silvermint | |
| 2013/0261977 A1 | 10/2013 | Shanks | |
| 2014/0104098 A1 | 4/2014 | Linden | |
| 2017/0038240 A1 | 2/2017 | Huang | |
| 2018/0017426 A1 | 1/2018 | Honeck | |

\* cited by examiner

SYSTEM FOR SENSING FLOWABLE SUBSTRATE LEVELS IN A STORAGE UNIT

CROSS-REFERENCE TO RELATED APPLICATIONS

This application is a continuation of U.S. application Ser. No. 14/813,935, filed Jul. 30, 2015, now U.S. Pat. No. 9,752,918, entitled "System for Sensing Flowable Substrate Levels in a Storage Unit", which claims the benefit of U.S. Provisional Application Ser. No. 62/033,040, filed Aug. 4, 2014, entitled "System for Sensing Flowable Substrate Levels in a Storage Unit," which is incorporated by reference herein in its entirety.

BACKGROUND

Compartments such as bins, tanks, elevators, terminals, and silos are commonly used to hold bulk materials such as grains, woodchips, coal, etc. for storage. For example, in the agricultural context, grain storage units, commonly called "grain elevators," "grain bins," or "grain terminals" are used to store various forms of flowable substrates such as wheat, rice, corn, etc. For simplicity, the term grain is used herein to refer to any type of flowable substrate. Likewise, the term grain bin is used herein to refer to all structures for storing flowable substrates.

It is very important to the grain, feed, seed, and ethanol industries to be able to ascertain the correct amount of grain housed in grain bins. Knowing the correct inventory is essential to the production of goods and therefore to the financial performance of the business. Getting an accurate measurement, however, can be very difficult. Grain is generally deposited into a grain bin from one location near the top of the container, but for various reasons, however, the grain inside the grain bins may come to rest in uneven, non-uniform levels. This uneven surface makes it very difficult for workers to safely assess accurate volumes.

Manual measurements of grain levels can be dangerous. For example, bins can develop hazardous atmospheres, which can limit the amount of oxygen available for breathing. In addition, grain can clump together from moisture or mold, which creates an empty space beneath the grain as it is removed from the bin. The "bridging" effect that forms from this circumstance can prove to be deadly to a worker who stands on the clumped grain. If the clumped grain collapses into the open area below, a worker standing on the collapsing grain could fall victim to an avalanching effect, which has the potential to burying the worker.

Systems for determining grain levels in grain bins without human interaction have been described in prior art. Single point measurements using technology such as bobs, guided wave radar, open air radar, and ultrasonic have been used to increase the accuracy of grain measurements. Multiple point measurements that implement technology such as 3D level scanners and bob systems are able to measure the level of grain at multiple points in the bin. Multiple point measurement systems that can scan the surface of the grain are able to take multiple measurements at once to better account for variations in the topography of the grain. Single and multiple point measurement systems, however, require new, expensive scanning hardware to be mounted to one or more points on each grain bin. The technologies used to measure the grain must be designed to not generate sparks that could ignite flammable suspended particulate matter in the grain bin.

It is thus desirable to provide a system for accurately measuring the amount of grain housed within a grain bin in real time safely and efficiently.

SUMMARY

In general terms, this disclosure is directed to estimating the level of flowable substrate in a storage unit. In one possible configuration and by non-limiting example, the present disclosure describes a system for estimating the amount of a flowable substrate in a storage unit comprising: a transmission line configured to extend from a top portion of a storage unit to a bottom portion of the storage unit, a transmitter electrically connected to the transmission line at a lower end portion of the transmission line; a conductor extending from a top portion of a storage unit to a bottom portion of the storage unit; a receiver positioned at a top portion of the conductor; a microprocessor configured to cycle through frequencies to be transmitted by the transmitter and identify the frequency that corresponds to the resonant frequency of the conductor; and wherein the resonant frequency of the conductor changes and is correlated to the length of the conductor that extends above the surface level of the flowable substrate in the storage unit.

In another embodiment, a system for estimating the amount of a flowable substrate in a storage unit is comprised of a transmission line configured to extend from a top portion of a storage unit to a bottom portion of the storage unit; a wire electrically connected to the transmission line, the wire configured to extend from a top portion of the storage unit to a bottom portion of the storage unit; electrical components arranged in series along the wire; a receiver located at the top portion of the wire; and wherein at least one characteristic of the signal transmission between the transmission line and the receiver is correlated to length of the wire that extends above the surface of the flowable substrate in the storage unit.

In another embodiment, a method of measuring a flowable substrate within a storage unit comprises the steps of: sending a radio signal from a first wire to a second wire, and analyzing the signal received via the second wire to estimate the amount of grain in the storage unit.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
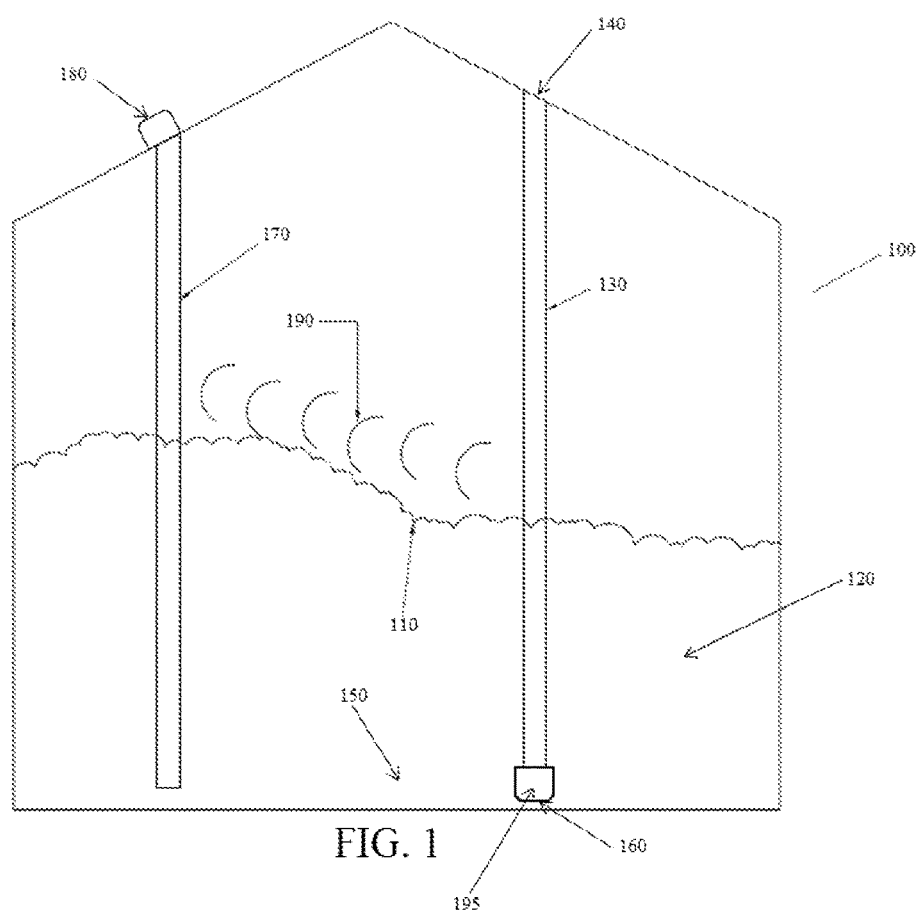
FIG. 1 is an illustrative embodiment of a storage unit containing two cables, surrounded by flowable substrate, for signal transmission and reception.

Various embodiments will be described in detail with reference to the drawings, wherein like reference numerals represent like parts and assemblies throughout the several views. The example embodiments set forth in this specification are not intended to be limiting and merely set forth some of the many possible embodiments for the appended claims.

Figure 2:
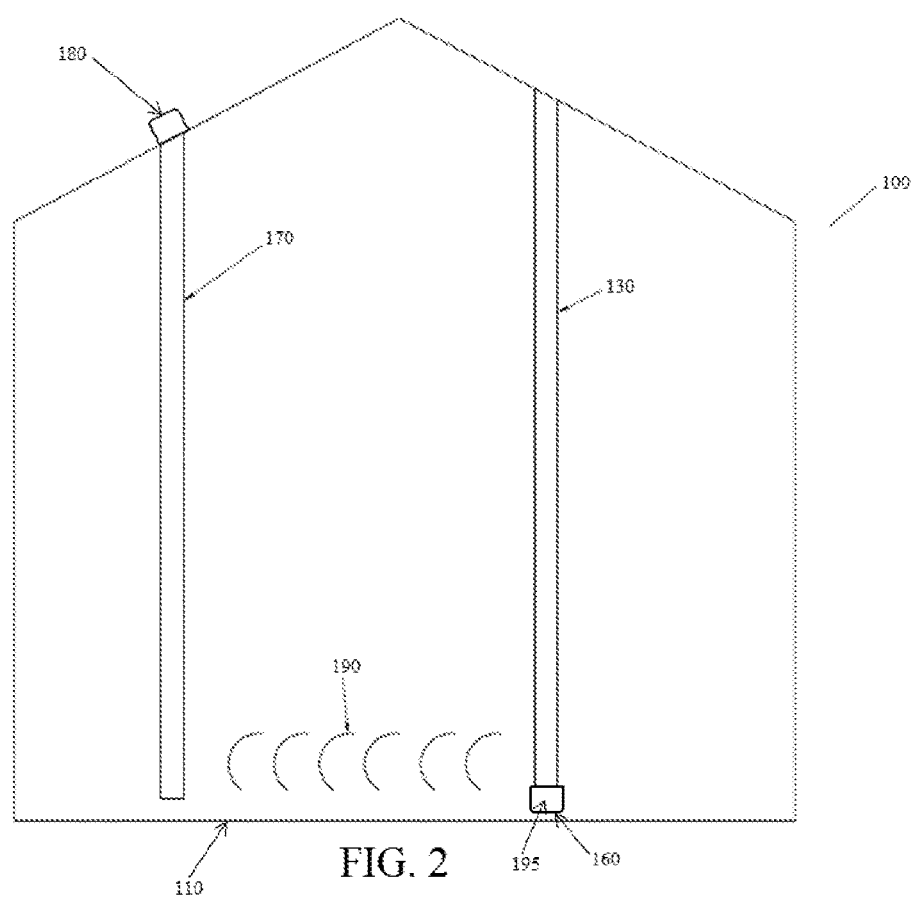
FIG. 2 is an illustrative embodiment of the storage unit shown in FIG. 1 without flowable substrate therein.

FIG. 1 is an illustrative embodiment of a storage unit 100 partially filled with a flowable substrate 120. In the depicted embodiment, the system for estimating the amount of a flowable substrate 120 in a storage unit 100 is comprised of a transmission line 130 configured to extend from a top portion 140 of a storage unit 100 to a bottom portion 150 of the storage unit 100; a transmitter 160 electrically connected to a transmission line 130 at a bottom portion 150 of the transmission line 130; a conductor 170 acting as an antenna and extending from a top portion 140 of a storage unit 100 to a bottom portion 150 of the storage unit 100; a receiver 180 positioned at a top portion of the conductor 170; and a microprocessor 195 configured to cycle through frequencies 190 to be transmitted by the transmitter 160 to identify the frequency 190 that corresponds to the resonant frequency of the conductor 170. FIG. 2 is an illustrative embodiment of the storage unit 100 shown in FIG. 1, but with no flowable substrate 120. FIG. 2 illustrates the basic concept for determining the substrate level 110 of FIG. 1.

In the depicted embodiment dedicated microprocessor 195 is located within the storage unit 100 adjacent a bottom portion 150 of the transmission line 130. In other embodiments the microprocessor 195 is located outside of the storage unit 100. In an alternative embodiment a wire extends up alongside of the transmission line and out of the storage unit to a microprocessor that is capable of other function such as temperature monitoring. An example of such a microprocessor is Extron's BusMux Pro HD multiplexer.

As illustrated in FIG. 1 and FIG. 2, a transmission line 130, for example a coaxial cable, extends vertically from a top portion 140 of the storage unit 100 to a bottom portion 150 of the storage unit 140. In one embodiment of the present disclosure, a transmitter 160 is attached to the transmission line 130 at some lower end portion of the transmission line 130. Using a device containing a microprocessor 195, the frequency 190 transmitted by the transmitter 160 is able to be tuned to a range of frequencies 190 to determine the resonant frequency 190 of the antenna. In one embodiment, the antenna is comprised of a conductor 170 such that when an electromagnetic wave is incident upon the conductor 170, the conductor 170 intercepts some of the power contained in the electromagnetic wave. The incident electromagnetic wave produces a voltage at the antenna terminals, which is then analyzed by the receiver 180.

In FIG. 2, the length of the conductor 170 (antenna) is known. The resonant frequency 190 of the antenna can be determined based on the known length of the conductor 170. The transmitter 160 can be configured to transmit the resonant frequency 190 of the antenna. The radio signal transmitted at resonant frequency 190 in FIG. 2 is received by the receiver 180 and read with almost no attenuation because there is a negligible amount of flowable substrate 120 in the storage unit 100 surrounding the conductor 170 to attenuate the radio signal. This resonant frequency 190 serves as a base value because at that frequency 190, the entire length of the conductor 170 extends above the surface of a negligible to nonexistent surface level of flowable substrate 120. Thus, a conductor 170 (antenna) of maximum length in the storage unit 100 represents a negligible flowable substrate level 110 at that point of measurement.

Referring back to FIG. 1, a storage unit 100 is filled with a flowable substrate 120, but the exact substrate surface level 110 in the storage unit 100 is unknown. To determine the level of the flowable substrate 120, the length of a conductor 170 (antenna) that extends above the substrate surface level 110 is needed. In one embodiment of the present disclosure, a transmitter 160 employing a microprocessor 195 based system is configured to systematically transmit discrete frequencies 190 in a range of frequencies 190 until one of those frequencies 190 is read without attenuation by the receiver 180. This cyclical process can be repeated automatically as many times and as often as needed by the operator. A flowable substrate 120 such as corn, for example, contains water molecules, which can attenuate the signal transmitted from the transmitter 160 at various frequencies high enough to be attenuated at a certain emitted power level. This attenuation in turn affects the resonant frequency 190 of the conductor 170 (antenna).

Once the transmitter 160 transmits a frequency 190 that is able to be read un-attenuated by the receiver 180, the length of the conductor 170 that extends above the surface level 110 of the flowable substrate 120 in the storage unit 100 can be calculated. The receiver 180 communicates the un-attenuated signal frequency 190 to a set of electronics that then computes the length of the conductor 170 and then the surface level 110 of flowable substrate 120 in the storage unit 100.

Figure 3:
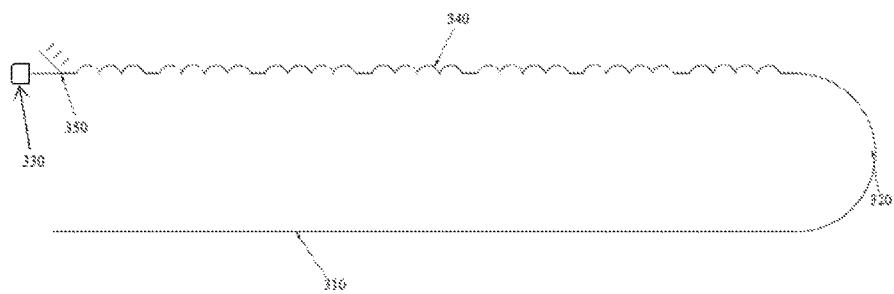
FIG. 3 is a cable schematic of a transmission line connected to a plurality of serially connected inductors.

FIG. 3 is another embodiment of the present disclosure. A transmission line 310 is configured to extend from a top portion 140 of a storage unit 100 to a bottom portion 150 of a storage unit 100. A wire consisting of inductors 340 connected in series extends from a top portion 140 to a bottom portion 150 of a storage unit 100 where it is electrically connected to a transmission line 310. An antenna 350 located at a top portion 140 of a storage unit receives a signal where it is then processed by a receiver 330 to determine the flowable substrate level 110. In an embodiment illustrated in FIG. 3, a signal of fixed frequency 190 is sent through the transmission line 310. The signal then passes through one or more of the inductors 340 before it is received by the antenna 350 and receiver 330. When a flowable substrate 120 is present, the signal must pass through the series-connected inductors 340 that are submerged in the flowable substrate 120. The more flowable substrate present in a storage unit 100, the more inductors 340 the signal must pass through before the signal can be read by the antenna 350 and receiver 330. The receiver 330 measures the lag experienced by the signal as it passes through the inductors 340 submerged in flowable substrate 120. The lag, or time deviation, experienced by the signal is interpreted by the receiver 330 and the flowable substrate surface level 110 is determined from the results. It should be appreciated that although the embodiment in FIG. 3 uses inductors 340 connected in series, the present disclosure is not limited to only the use of inductors 340 as electrical components.

Figure 4:
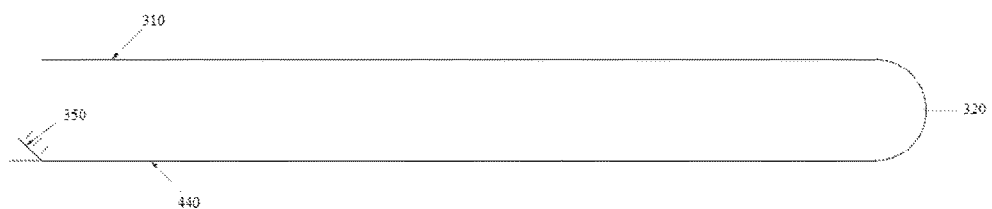
FIG. 4 is a cable schematic of a transmission line connected to a copper wire.
Figure 5:
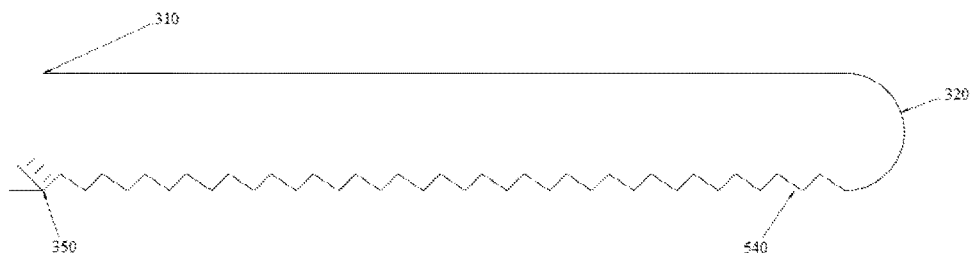
FIG. 5 is a cable schematic of a transmission line connected to a plurality of serially connected resistors.
Figure 6:
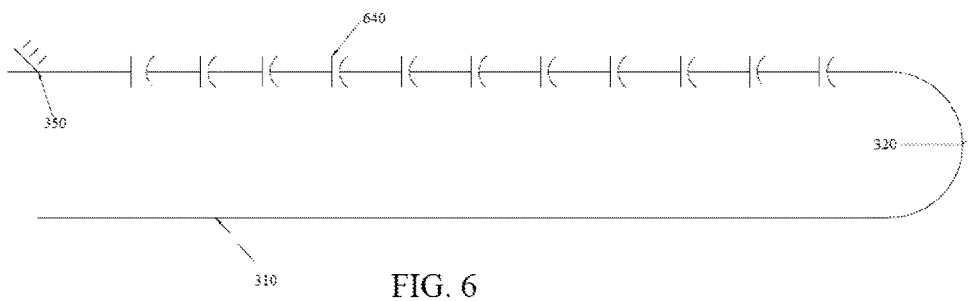
FIG. 6 is a cable schematic of a transmission line connected to a plurality of serially connected capacitors.
Figure 7:
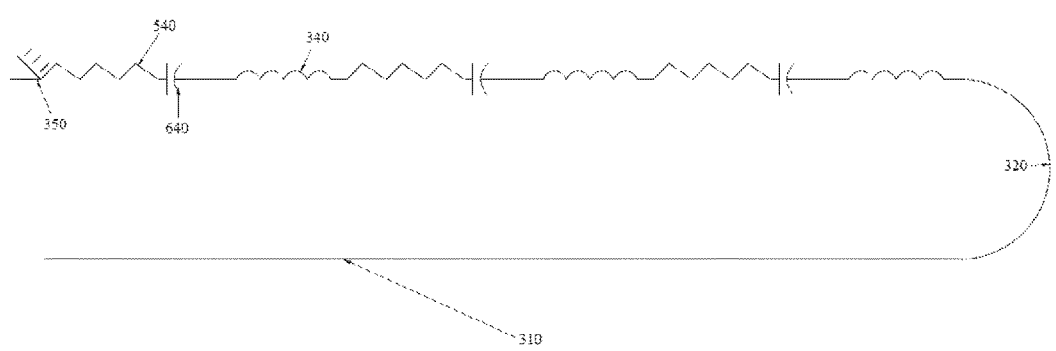
FIG. 7 is a cable schematic of a transmission line connected to a plurality of serially connected resistors, inductors, and capacitors.

Referring to FIGS. 4-7, alternative configurations of the wire of FIG. 3 are shown. In FIG. 4, a conductor, such as a copper wire 440 is used to determine the flowable substrate surface level 110 present in a storage unit 100. In FIG. 5, resistors 540 connected in series along a wire are used to determine the flowable substrate surface level 110 present in a storage unit 100. In FIG. 6, capacitors 640 connected in series along a wire are used to determine the flowable substrate surface level 110 present in a storage unit 100. In FIG. 7, a combination of at least resistors 540, capacitors 640, and inductors 340, all connected in series along a wire, are used to determine the flowable substrate surface level 110 present in a storage unit 100.

Figure 8:
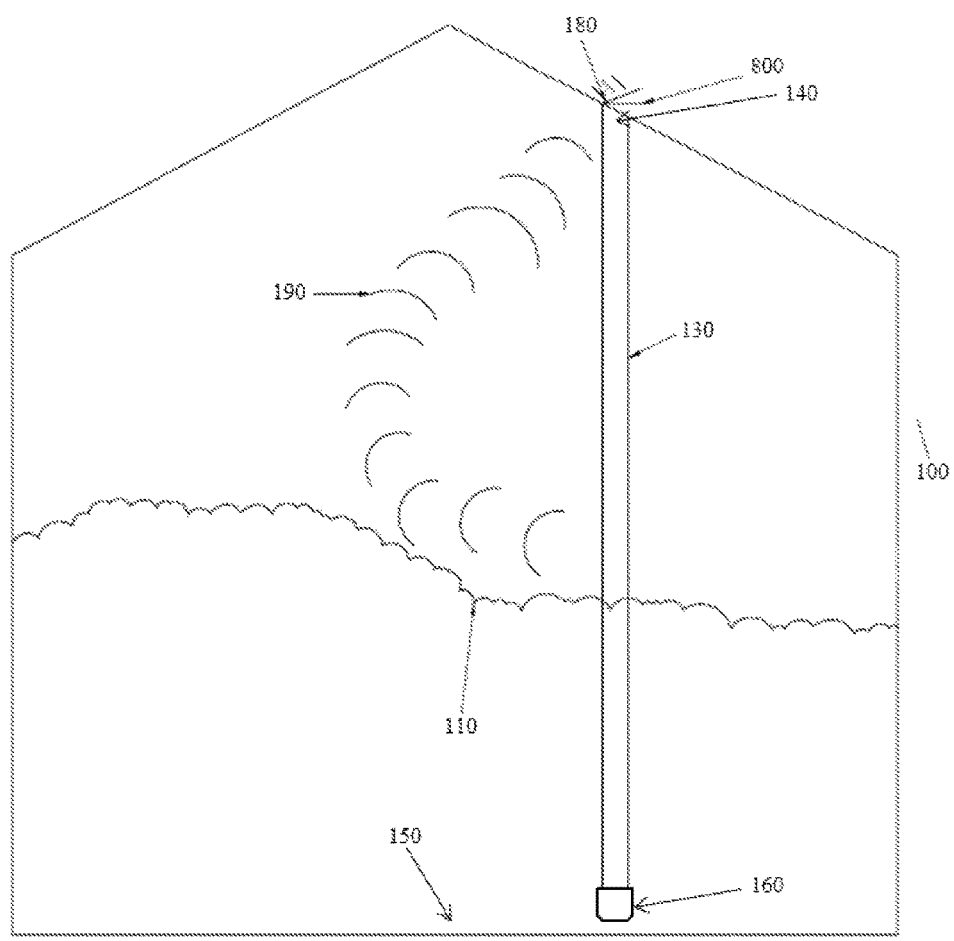
FIG. 8 is an illustrative embodiment of a storage unit comprising one cable connected to an antenna.

FIG. 8 depicts another embodiment of the present disclosure, in which a single cable is used to determine the flowable substrate 120 surface level 110. A frequency 190 signal is sent down the transmission line 130, and a transmitter 160 transmits a frequency 190 signal inside the storage unit 100. As the frequency 190 is tuned by the transmitter 160, it is attenuated by the flowable substrate 120 in the storage unit 100. At a specific resonant frequency 190 the signal is able to be recorded after the top of the flowable substrate surface level 110 without interference. An antenna 800 receives the signal with little interference, and a receiver 180 electrically connected to the antenna 800 interprets the signal to determine the substrate surface level 110.

Figure 9:
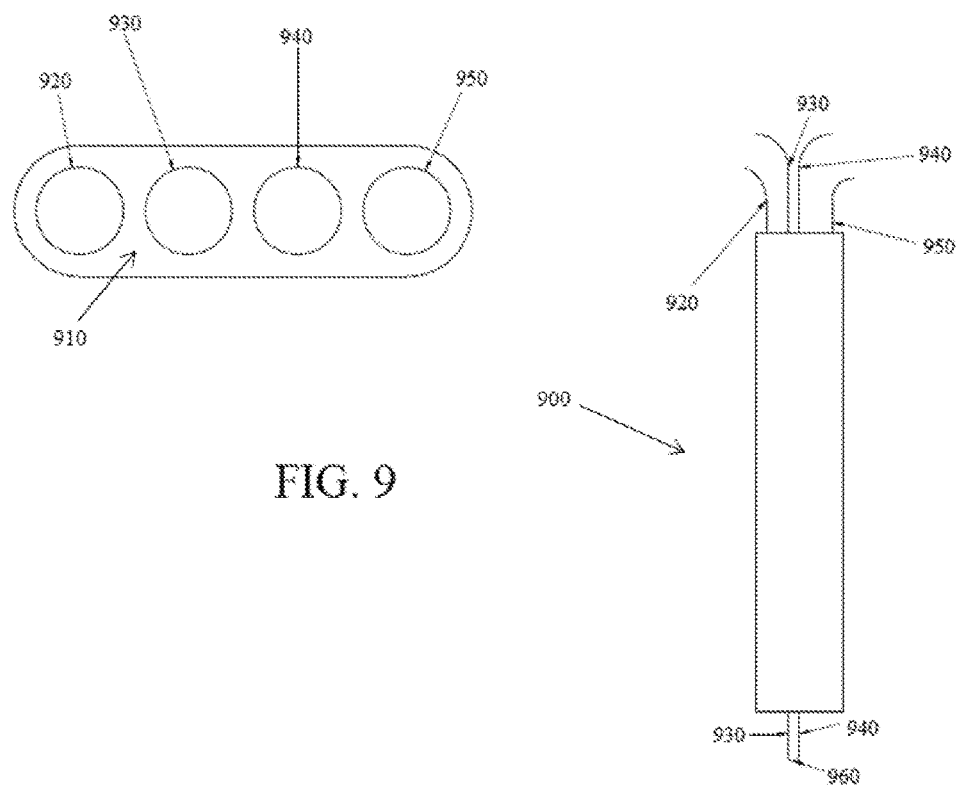
FIG. 9 is a cross-section and front illustration of the contents of an example cable assembly.

FIG. 9 depicts an example cable assembly 900 system that can be used for the aforementioned embodiments of the present disclosure. In the example illustrated by FIG. 9, a cable assembly 900 consists of a molding/sheathing 910 used to contain one or more cables or wires within the cable assembly 900; a cable rope 920 used for structural support within the storage unit 100; a transmission line 130 such as a coaxial cable 930; a grain level sensor 940, and a conductor such as a grain level sensor 940. A thermocouple wire may be used in one or more of the previous embodiments as part of the present disclosure to measure a flowable substrate 120 level. Thermocouple wires 950 are used in prior art to determine the temperature at various locations along a y-axis orientation of a storage unit 100. In some embodiments, a coaxial cable 930 and a grain level sensor 940 are connected using a splice 960 or other means to ensure the information contained transmitted signals is accurately relayed to a grain level sensor 940.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for estimating a surface level of a flowable substrate in a storage unit comprising:
    a cable including a sheath and first and second conductors housed in the sheath, central axes of the first and second conductors being spaced apart from each other on opposite sides of a central axis of the cable, the first conductor comprising a transmission line configured to extend from a top portion of the storage unit to a bottom portion of the storage unit, the second conductor extending from a top portion of the storage unit to a bottom portion of the storage unit; and
    a receiver positioned at a top portion of the second conductor and adapted to receive a signal transmitted via the transmission line to the second conductor;
    wherein at least one characteristic of a signal transmission between the transmission line and the receiver correlates to a length of the second conductor that extends above the surface level of the flowable substrate, the at least one characteristic being one or more of: a) a resonant frequency of the signal received by the receiver as compared to a base value resonant frequency of the second conductor; b) an attenuation of the signal transmission; or c) a time delay of the signal transmission.

2. The system of claim 1,
    wherein one or more electrical components are arranged along the second conductor.

3. The system of claim 2, wherein the one or more electrical components include one or more inductors.

4. The system of claim 2, wherein the one or more electrical components include one or more resistors.

5. The system of claim 2, wherein the one or more electrical components include one or more capacitors.

6. The system of claim 2, wherein the one or more electrical components include a combination of at least inductors, resistors, and capacitors.

7. The system of claim 2, wherein the transmission line is a coaxial cable.

8. A system for estimating a surface level of a material in a storage unit comprising:
    a cable including a sheath and first and second conductors housed in the sheath, central axes of the first and second conductors being spaced apart from each other on opposite sides of a central axis of the cable, the cable and the first and second conductors extending from a top portion of the storage unit to a bottom portion of the storage unit;
    the first conductor comprising a transmitter adapted to transmit a first signal; and
    a receiver positioned at a top portion of at least one of the first and second conductors and adapted to receive a reflected second signal provided from at least one of the first and second conductors;
    wherein a time delay between transmitting the first signal and receiving the second reflected signal correlates to a length of the cable that extends above the surface level of the material.

9. The system of claim 8, wherein the receiver is adapted to measure the time delay.

10. The system of claim 8, wherein at least one of the first and second conductors includes one or more electrical components.

11. The system of claim 10, wherein the one or more electrical components include one or more inductors.

12. The system of claim 10, wherein the one or more electrical components include one or more resistors.

13. The system of claim 10, wherein the one or more electrical components include one or more capacitors.

14. The system of claim 8, wherein the cable includes a support component adapted to provide structural support to the cable.

* * * * *